United States Patent Office 3,072,750
Patented Jan. 8, 1963

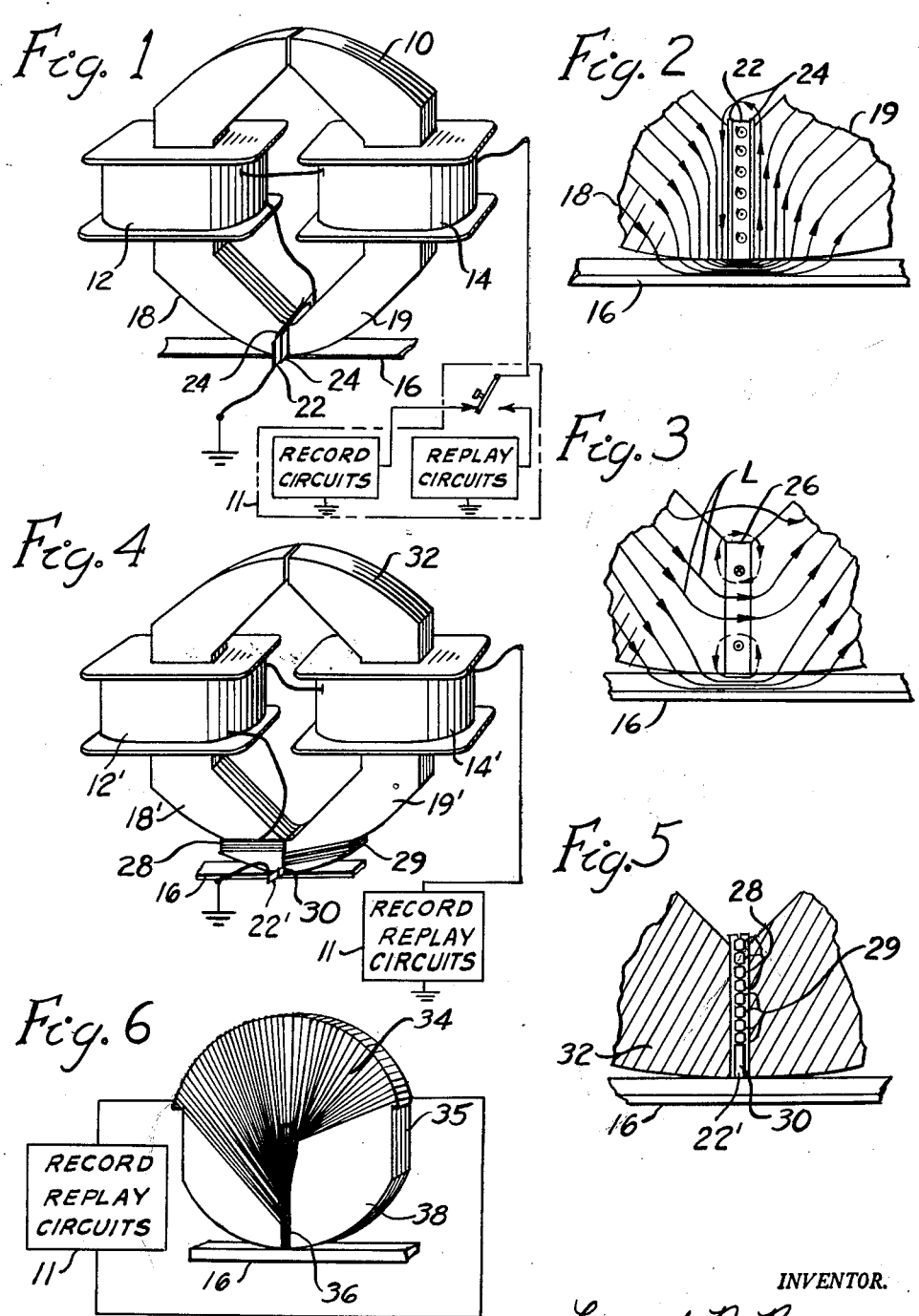

3,072,750
FLUX DIVERTER
Leonard D. Barry, 19300 Pennington Drive,
Detroit 21, Mich.
Filed May 18, 1953, Ser. No. 361,397
12 Claims. (Cl. 179—100.2)

This invention relates to means for directing the flux in a magnetic circuit to redistribute itself in parallel paths and relates in particular to a novel arrangment for diverting leakage flux from across a gap between adjacent poles of a magnetic recording-reproducing head.

Present ring-type recording-reproducing heads are provided with a nonmagnetic metallic shim usually .0004–.0005" thick separating the poles. Such a shim enables a considerable leakage flux to pass without entering the magnetic recording medium causing the flux to arrive at the pole tips with an unfavorable slant and reduced density, increasing the importance of good contact, reducing the output especially at the high frequencies, and having other disadvantages which are objects of my invention to improve.

An object of this invention is to divert the leakage flux across the gap of a ring-type recording head into the recording medium.

A further object is to cause the flux entering a recording medium to enter more nearly perpendicular than with ordinary longitudinal recording by establishing a field adjacent to the gap shim which is perpendicular to the recording medium.

A further object is to reduce the eddy currents in the shim of a ring head thereby reducing the resulting out-of-phase flux components which distort the recording.

A further object is to increase the flux density at the adjacent pole tips and increase the penetration of the flux ino the medium when recording and so provide a stronger signal, reduce the tendency of self demagnetization of the recorded signal, and enable the recording medium to take a higher frequency at a lower speed for a given output level than was previously practiced.

The forementioned, other, and further features and objects are provided by this invention, which should become apparent to those skilled in the art upon consideration of the description and accompanying drawings disclosing general characteristics and specific embodiments of this invention.

In accordance with this invention an electro-magnetic coil or shim is inserted on a parallel flux path and so arranged and electrically connected to expel external flux therefrom according to the current. It has been experimentally determined that the combined flux from two aiding paths in a third can be greater than the sum of the flux from each aiding path separately contributing, since the path not contributing provides a leakage path for the flux from the path contributing as illustrated hereinafter. This means that the leakage flux is diverted from the noncontributing path when the path is made to contribute a sufficiently large opposing flux, and the third path then carries the total of both paths instead of that contributed by the first minus leakage through a nonconributing path.

In the drawings:

FIGURE 1 is a perspective view of a ring-type magnetic recording-reproducing head having an electro-magnetic shim connected in series with its coils, the recording medium being in position against the head.

FIGURE 2 is a sectional view of the shim with adjacent portions of the poles and recording medium in place taken perpendicular to the pole faces through the head in a plane of the flux and showing flux lines at a particular instant.

FIGURE 3 is a sectional view of an ordinary shim with adjacent poles and recording medium taken on a plane through a head parallel with the recorded flux, with the main flux, eddy current, and eddy current flux appropriately represented for a particular instant.

FIGURE 4 is a perspective view of a ring-type magnetic head having electro-magnetic shim coils connected in series with the main coils.

FIGURE 5 is a partial sectional view through and perpendicular to the gap shim and pole faces of the head shown in FIGURE 4.

FIGURE 6 is a perspective view of a novel magnetic head utilizing a single coil to both divert flux from the gap and provide the main flux.

Referring to the drawings and in particular to FIGURES 1 and 2 magnetic recording-reproducing head 10, having coils 12 and 14 connected across a recording current source 11, is in contact with magnet recording medium 16. Poles 18 and 19 are separated by a metallic gap shim 22 of high conductivity having an oxide coating formed thereon or other insulating material 24 to keep the current confined to the shim and out of the poles. The shim is preferably the full height of the facing poles, fills the gap between and extends beyond the sides of the poles, and makes contact with the tape. Tape 16 is preferably an iron oxide tape so that it acts as an insulator and does not carry stray current from the bottom edge of the shim that is in contact therewith. Shim 22 should have greater wear resistance than the pole pieces 18 and 19, a requirement of present shims, to prevent worn-off magnetic material from lodging across the gap. The shim can be made considerably thinner than present shim pieces for the same proportion of leakage flux. The effectiveness of the current in preventing flux leakage from pole to pole is directly proportional to the sum of the velocities of the number of electrons encountered. Therefore the gap shim current encountered by leakage flux should be kept at a high value, and the narrower the gap the higher the current density should be for equal results. The shim is preferably connected in series with the coils 12 and 14 to insure that the current is in phase in the flux contributing elements. The shim is preferably on the grounded side of the coils as shown. The shim is connected so as to add to the flux from the coils as shown in FIGURE 2, thus the shim is a turn side of coil 12. The current in the shim being directed outward from the paper provides the flux at a given instant illustrated by the arrows. This current not only contributes flux reaching the tape 16 but directs vertically into the tape flux from the coils which would have otherwise taken a path across the shim.

Flux lines never cross, but upon approaching run parallel. Therefore, since the current through the shim can be made sufficiently strong relative to the field intensity across the gap, the flux from the shim piece can direct the flux from the coil into the recording medium parallel to the flux from the shim which is perpendicular to the medium. The flux density at the pole tips is increased and the flux driven deeper into the medium, which in effect increases the length of the recorded magnet and decreases the demagnetizing effect of the poles.

During playback of recorded signals, the shim adds to the voltage induced in the circuit, and the resulting current through the circuit aids in preventing magnetic leakage across the gap.

FIGURE 3 illustrates the eddy currents generated in an ordinary gap piece 26 due to leakage flux L therethrough at an instant that the flux is increasing in the direction of the arrows. Lenz's law talls that the direction of the flux resulting from the current generated by changing flux opposes its change. The eddy current was established in the direction shown when the flux started to decrease from the opposite direction to flux lines L shown. Thus the recording flux leads the flux established by the eddy current by at least 90 to about 180 electrical degrees, which results in a phase shift of the flux component shown in dashed lines, which distorts the recording. The higher the frequency the greater the eddy current effect. FIGURE 2 shows how this eddy current effect is overcome by my invention.

Various other flux diverting gap spacers can be used such as the coil sides of coils 28 and 29 which are in the recording-reproducing gap 30 of head 32, FIGURE 4. The wire of these coils can be flattened in the gap space as shown in FIGURE 5. A shim 22' deep enough to provide for wear of the head 32 is connected in series with the coils as the outer turn side of coil 29. The full surface of coils 28 and 29 aid in establishing the flux for recording; and these coils add to the voltage induced in the system on playback, since the flux only cuts one side of each coil and they are connected to pass current from source 11 simultaneously in the same direction about cores 18' and 19' as is passed by coils 12' and 14' respectively.

Coil 34 of magnetic head 35 (shown in FIGURE 6) diverts the flux from gap 36 with the coil sides of coil 34 which are in the gap, and the remainder of the coil establishes the general flux. This head I choose to call a slit disc head though it is still classifiable as a ring head, since it has more than one pole adjacent the medium. The core 38 might carry two coils similarly as coils 28 and 29 of FIGURE 4.

Having thus described my invention as applied and embodied in a variety of ways it will be understood that I do not wish to be limited to only the variations shown, and I therefore contemplate to cover in the appended claims all such modifications and applications as fall within the true spirit and scope of my invention.

I claim:

1. In a magnetic head comprising a magnetic core having adjacent poles and a coil on said core arranged to oppositely polarize said poles; a shim piece separating said poles and extending beyond the side edges of said poles and electrically grounded beyond one side edge of the poles and beyond the other side edge connected in series to the coil winding of the head said shim being electrically conductive.

2. A magnetic head which comprises, a disk core, a gap extending substantially axially through the center and radially outward to the edge whereat it forms poles, a coil for magnetizing said core having a side thereof passing through said gap and filling said gap substantially at the radially outer edge of the gap.

3. A magnetic head as claimed in claim 2 said gap being completely filled with said coil.

4. A magnetic head as claimed in claim 2 said coil having its return portion fanned out over the surface of said core.

5. In an electromagnetic recording-reproducing head, a core having confronting pole portions with a gap therebetween, an electrical conducting spacer in said gap having ends extending beyond the side edges of said gap, a coil about said core having one end thereof electrically connected to one end of said spacer beyond the side edge of said core, and magnetic recording-reproducing means connected across the other end of said coil and said spacer whereby current through said spacer and coil is in phase during both recording and playback.

6. In a transducer as claimed in claim 5, said spacer comprising a thin strip and insulating means separating said strip from adjacent pole faces of said core.

7. In a transducer as claimed in claim 5, said spacer being a portion of said coil.

8. In a transducer as claimed in claim 5, said spacer being a gap coil, said core being shaped to receive said gap coil about a pole of said core.

9. In a magnetic recording-reproducing head having two adjacent poles, the coil means for energizing said head during recording having a portion of a coil side lying in the gap between said poles and a greater number of turns in series aiding wrapped about said core.

10. In a magnetic recorder a recording-reproducing head which comprises an electromagnet having adjacent and substantially coplanar poles; electrical coil means, a coil side of which is sandwiched between said poles; a magnetic recording medium arranged to receive magnetic flux from said coil side and from said electromagnet, said coil side being electrically connected to said electromagnet with such polarity that flux established by said electromagnet is diverted to the medium by said coil side during recording and the output current of said electromagnet is increased by the output current of said coil side during replay.

11. In a recorder as claimed in claim 10, said coil side comprising a plurality of turn sides, one turn side between said poles being a shim and extending to the plane of the face of said medium.

12. In a recorder as claimed in claim 10 said medium engaging an outer turn side of said coil side, said turn side being in the form of a gap shim separating said poles, means insulating the flat sides of said turn side from adjacent said poles, said tape having a magnetic oxide layer in contact with the conductive material of said turn side.

References Cited in the file of this patent

UNITED STATES PATENTS

| | | |
|---|---|---|
| 2,418,542 | Camras | Apr. 8, 1947 |
| 2,538,405 | Zenner | Jan. 16, 1951 |
| 2,539,400 | Camras | Jan. 30, 1951 |
| 2,565,191 | Zenner | Aug. 21, 1952 |
| 2,615,097 | Camras | Oct. 21, 1952 |
| 2,628,285 | Camras | Feb. 11, 1953 |
| 2,628,286 | Rettinger | Feb. 10, 1953 |
| 2,660,622 | Field | Nov. 24, 1953 |

FOREIGN PATENTS

| | | |
|---|---|---|
| 693,664 | Germany | July 16, 1940 |